US008184893B2

(12) United States Patent
Calman

(10) Patent No.: US 8,184,893 B2
(45) Date of Patent: May 22, 2012

(54) ENHANCED NOTE PROCESSING

(75) Inventor: Matthew Alexander Calman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1133 days.

(21) Appl. No.: 11/950,992

(22) Filed: Dec. 5, 2007

(65) Prior Publication Data
US 2009/0148025 A1    Jun. 11, 2009

(51) Int. Cl.
*G06K 9/00* (2006.01)
(52) U.S. Cl. .......................................... 382/135; 705/45
(58) Field of Classification Search .................. 382/100, 382/137, 138, 139, 140, 112; 705/45
See application file for complete search history.

(56) References Cited

U.S. PATENT DOCUMENTS

| 4,947,321 | A | * | 8/1990 | Spence et al. .................... 705/45 |
| 5,917,930 | A | | 6/1999 | Kayani et al. |
| 6,510,238 | B2 | | 1/2003 | Haycock |
| 7,006,664 | B2 | * | 2/2006 | Paraskevakos ................ 382/100 |
| 7,366,339 | B2 | * | 4/2008 | Douglas et al. ............... 382/137 |
| 7,537,153 | B2 | * | 5/2009 | Hurwitz et al. ............... 235/379 |
| 7,599,643 | B2 | * | 10/2009 | Takamatsu .................... 399/100 |
| 2003/0116478 | A1 | | 6/2003 | Laskowski |
| 2005/0259858 | A1 | * | 11/2005 | Su et al. ........................ 382/135 |
| 2006/0010071 | A1 | * | 1/2006 | Jones et al. ..................... 705/42 |
| 2007/0172106 | A1 | | 7/2007 | Paraskevakos |
| 2008/0037856 | A1 | * | 2/2008 | Paraskevakos ................ 382/140 |

FOREIGN PATENT DOCUMENTS

| DE | 10050486 | 4/2002 |
| DE | 102004033092 | 1/2006 |

OTHER PUBLICATIONS

PCT International Search Report mailed Feb. 16, 2009, International Application No. PCT/US2008/085667, 12 pages.
Federal Reserve Bank of Atlanta website; http://www.frbatlanta.org/indenx.cfm, 2 pages, Aug. 7, 2007.
Brochure from Giesecke & Devrient, BPS 2000 BPS 3000, Banknote Processing Systems for Central Bank Applications, 2003, 8 pages.
Welcome to Where's George?, http://www.wheresgeorge.com/, downloaded Dec. 5, 2007, 8 pages.

* cited by examiner

*Primary Examiner* — Anand Bhatnagar
(74) *Attorney, Agent, or Firm* — Banner & Witcoff, Ltd.; Michael A. Springs

(57) ABSTRACT

Techniques and systems are disclosed to perform, in some examples, the steps of receiving a note or an image of a note, imaging at least a portion of the note, determining a value of at least one field indicated by a predetermined identifier of the note through character and mark recognition, and storing information regarding the note in a memory. The information regarding the note that may be stored in a memory may be forwarded to a regulatory agency or an external entity for reporting or record-keeping.

18 Claims, 4 Drawing Sheets

ENHANCED NOTE PROCESSING

FIELD OF THE INVENTION

Aspects of the disclosure generally relate to enhanced currency or note processing with data recognition.

BACKGROUND

In processing currency or other notes, some organizations use automated processing devices for counting and sorting such notes. Certain devices may include counterfeit testing capabilities. These devices generally use ultraviolet, magnetic and infrared detection to find suspicious or fake bills.

In document processing, optical character recognition ("OCR") and optical mark recognition ("OMR") are sometimes used to identify portions of documents. OCR is generally the mechanical or electronic translation of images of handwritten or typewritten text (usually captured by a scanner) into machine-editable text. OMR is generally the capturing of data by contrasting reflectivity at predetermined positions on a page.

A company processing the currency, or a state or federal regulatory agency, however, may have a need or desire for information relating to the processed currency. Currently, the processing of currency or other notes by merely using ultraviolet, magnetic and infra-red detection does not allow for tracking of information regarding specific bills. Furthermore, current currency counters do not provide a system or method for storing and potentially tracking the currency processed. OCR and OMR could be used to further identify information relating to processed currency or notes.

Certain cash-handling businesses are required to report large currency transactions to state and federal regulatory agencies. Large currency transactions are generally considered to be those exceeding a threshold set between $3,000 and $10,000. These transactions are studied carefully to prevent undesirable transactions by criminals and their organizations through currency exchanges with legitimate businesses. Casino operators have unique high-volume cash handling operations and are particularly susceptible to individuals who engage in such undesirable transactions.

Therefore, there exists a need in the art for enhanced techniques and systems to address the aforementioned circumstances.

BRIEF SUMMARY

Aspects of the present disclosure provide methods, systems and computer readable media for enhanced currency and/or note processing with data recognition. The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one embodiment, a method is disclosed comprising the steps of receiving a note, imaging at least a portion of the note, determining a value of at least one field indicated by a predetermined identifier of the note through character and mark recognition, and storing information regarding the note in a memory. The information regarding the note that may be stored in a memory may be forwarded to a regulatory agency or an external entity for reporting or record-keeping.

In a further embodiment, in accordance with aspects of the disclosure, aspects of the invention may be provided in a computer-readable medium. For example, a computer-readable medium may comprise computer-executable instructions to perform one or more of the method steps described herein.

BRIEF DESCRIPTION OF THE DRAWINGS

The present disclosure is illustrated by way of example and not limited in the accompanying figures in which like reference numerals indicate similar elements and in which.

DETAILED DESCRIPTION

In accordance with various aspects of the disclosure, a method and system for enhanced currency or note processing with data recognition is disclosed. Throughout this disclosure, the terms "note" and "notes" may be used to refer collectively to currency (U.S. or foreign), deposit tickets, labels, coupons, frequent player cards, and other items that may include identifying information such as a customer number, a serial number or other unique identification number.

Figure 1:
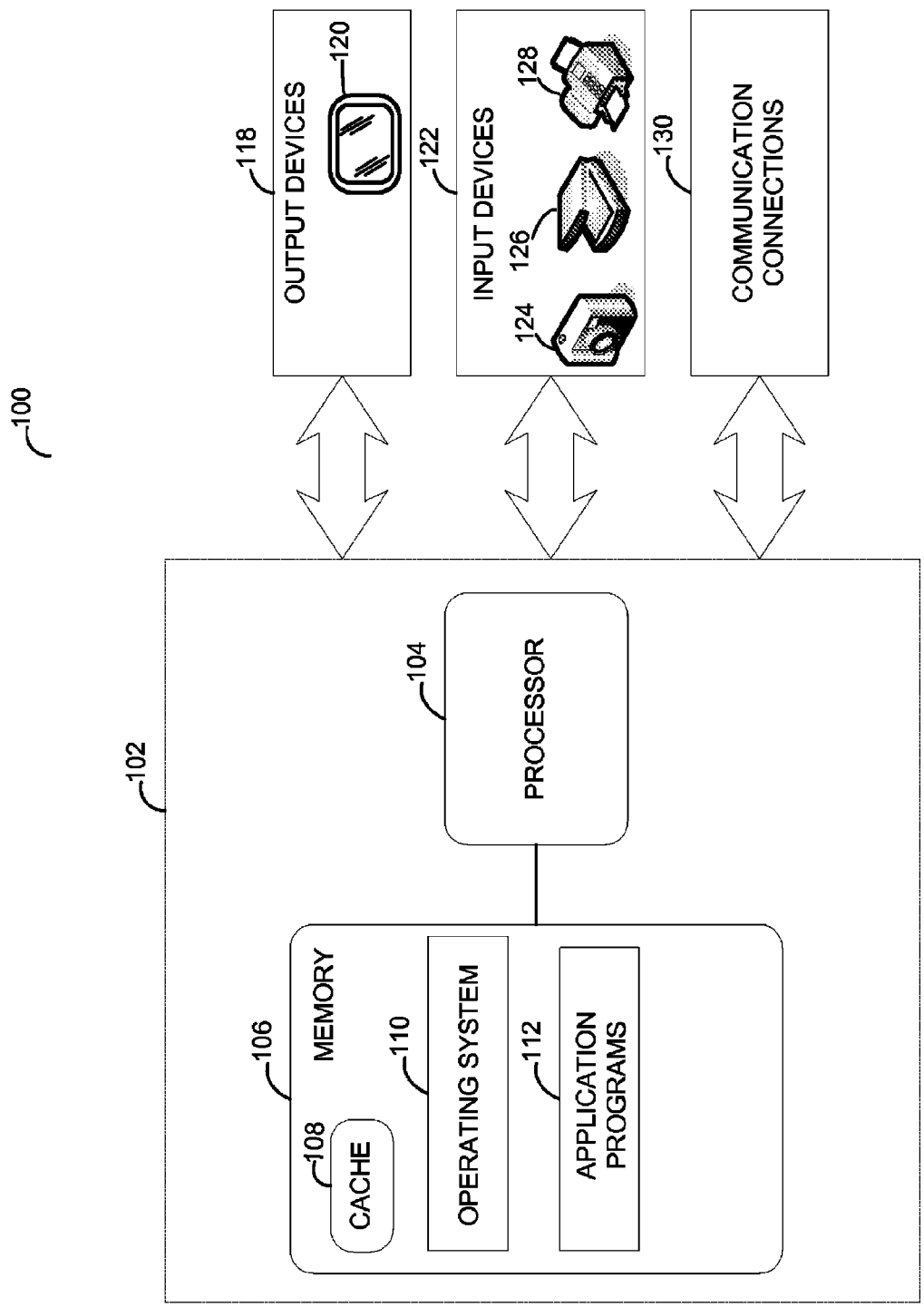
FIG. 1 depicts an illustrative personal computing device or workstation with peripheral devices in accordance with various aspects of the invention.

An example of an illustrative computing system 100 in which various aspects and embodiments of the invention may be implemented is shown in the simplified diagram in FIG. 1. The features of such a device are well-known to those of skill in the art and need not be described at length here. The illustrative system 100 is only one example of a suitable system and is not intended to suggest any limitation as to the scope of use or functionality of the invention. Suitable computing environments for use with the invention include a computing device or workstation 102 or system that supports interaction with input devices 122 (e.g., digital camera 124, document scanner 126, enhanced currency counter 128, etc.), output devices 118 (e.g., visual display 120), and communication connections 130 (e.g., Ethernet connection, IEEE 802.11, dial-up connection, etc.). The communication connections 130 may be used to allow the workstation 102 to communicate with other devices. With reference to FIG. 1, workstation 102 commonly includes a memory 106 and a processor 104 (e.g., an Intel microprocessor). Embodiments of the invention may incorporate workstation 102 into other devices.

Programs, comprising sets of instructions and associated data, may be stored in the memory 106, from which they can be retrieved and executed by the processing unit 104. Among the programs and program modules stored in the memory 106 are those that comprise or are associated with an operating system 110 as well as application programs 112. Application programs 112, such as a web browser application, Java runtime environment, note processing application, and others, and an operating system 110 are commonly installed in a computing device 102. The memory 106 may also include a cache 108 to enhance device performance. Computing system 100 includes forms of computer-readable media. Computer-readable media include any available media that can be accessed by the computing device 102. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Figure 2:
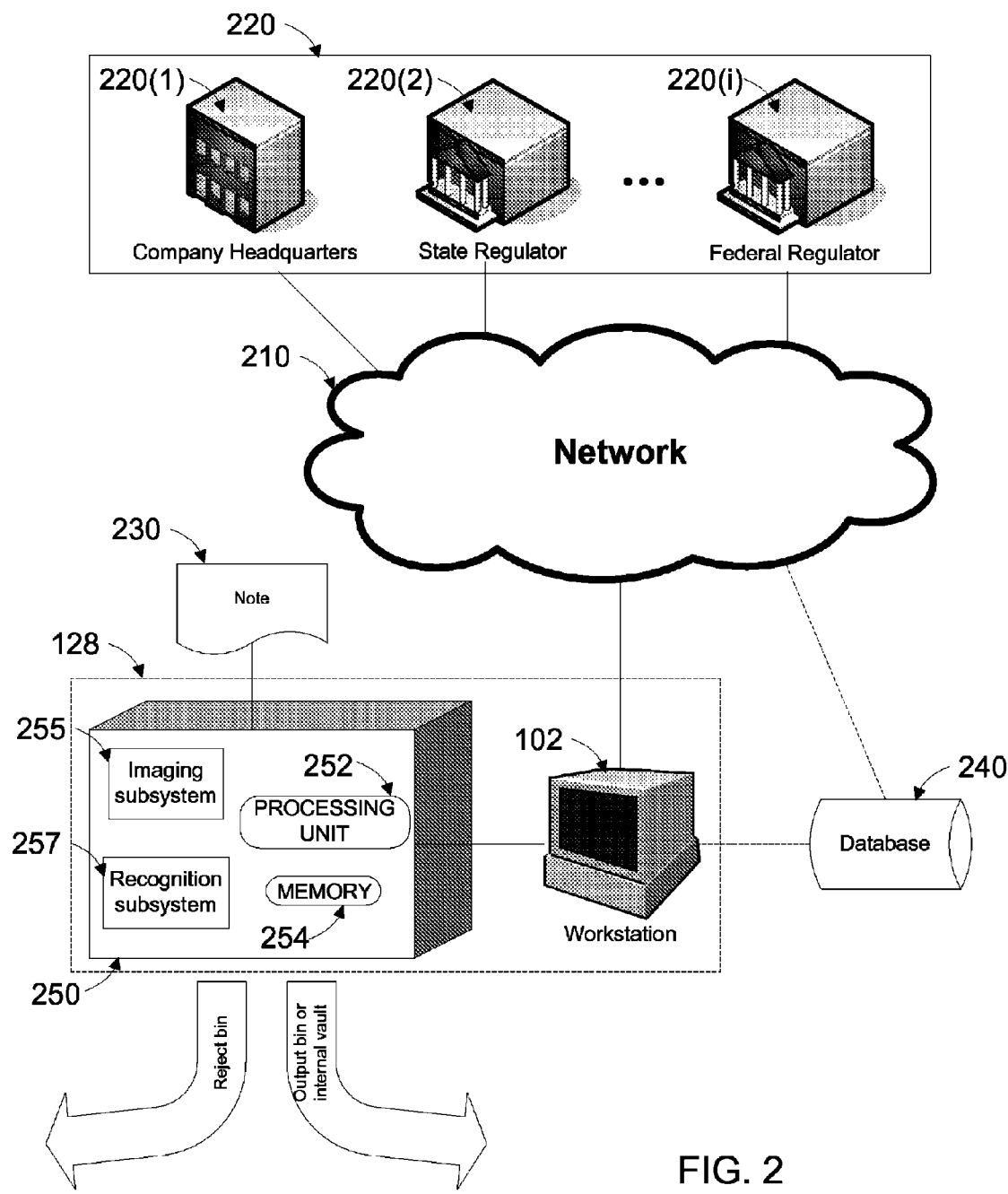
FIG. 2 shows an illustrative operating environment in accordance with various aspects of the invention.

FIG. 2 depicts a simplified, illustrative operating environment for implementing various aspects and embodiments of the invention. The illustrative operating environment in FIG. 2 is only one example of a suitable operating scenario and is not intended to suggest any limitation as to the scope of use or functionality of the invention. In accordance with various aspects of the invention, illustrated in FIG. 2 is workstation 102 in communication with note processing device 250. Workstation 102 may be a personal computer at the point of sale where notes (such as, for example, currency) are being received. Alternatively, workstation 102 may be integrated with note processing device 250. Workstation 102 may take the form of the computing environment depicted in FIG. 1. As such, workstation 102 may have installed an operating system 110 and applications, such as a note processing application.

As depicted in FIG. 2, an operative environment for implementing various aspects of the invention may include a network 210, external entities 220(1)-220(i) (collectively 220), a note 230, an enhanced currency counter 128, and a database 240. In one embodiment, as can be seen in FIG. 2, enhanced currency counter 128 includes a note processing device 250 coupled to workstation 102. Note processing device 250 may have its own processing unit 252 and memory 254. Note processing device 250 may also include various subsystems including imaging subsystem 255 and recognition subsystem 257. Other subsystems that may be included in a note processing device 250 include, but are not limited to, a fitness determination subsystem and a counterfeit detection subsystem. Moreover, in some embodiments, a combination as depicted in FIG. 2 of workstation 102 coupled to note processing device 250 may result in enhanced currency counter 128. Alternatively, note processing device 250 may include all necessary components such that enhanced currency counter 128 is equivalent to note processing device 250.*f*

In an embodiment as depicted in FIG. 2, note 230 may be passed to note processing device 250, which, in turn, may process note 230 as required. The processing of note 230 may include any combination of testing note 230 for fitness and/or for counterfeit detection through various methods and imaging all or a portion of note 230. In one embodiment, note processing device 250 analyzes an image of note 230 using OCR and/or OMR. Note processing device 250 may be coupled to workstation 102 so that note processing device 250 may pass information about notes to workstation 102 for further storage and/or analysis. In an alternative embodiment, note processing device 250 may pass an image of note 230 to workstation 102, which may then analyze the image of note 230. Information passed to workstation 102 may include whether the note is currency or some other type of note, the denomination of the currency, the serial number of the currency or other identifying information about the note, and confidence scores resulting from the OCR and/or OMR. In some embodiments, workstation 100 may optionally be integrated with enhanced currency counting device 126.

In some embodiments, workstation may also be connected to database 240. Database 240 may contain information to assist in the identification of counterfeit notes. For example, database 240 may include serial numbers and denominations of known counterfeit currency. In some embodiments, database 240 may include ranges for serial numbers that are known to be either valid or invalid. Additionally, in certain embodiments, database 240 may include known combinations of marks and data that can be used for comparison to notes that are processed. In an alternative embodiment, workstation 102 may access database 240 through network 210. In one embodiment, workstation 102 may store information regarding note 230 in its memory 106 for future use or to be forwarded on to any of various external entities 220 through network 210. In certain embodiments, database 240 may be maintained by external entities 220.

One skilled in the art will appreciate that the network 210 may be any of the Internet, wide area network (WAN), local area network (LAN), wireless LAN (e.g., a LAN using IEEE 802.11, a Bluetooth network, etc.) or any other telecommunications network (e.g., satellite, cable, dial-up, etc.) that permits communication between remote computing devices. Furthermore, the network 210 may include wired and/or wireless communication. For example, in one embodiment, image input device 124 may communicate wirelessly with server computing device 202, like the various other devices 216, 218 depicted in FIG. 2. One skilled in the art will appreciate that one or more combinations of the various embodiments depicted in FIG. 2 are contemplated by the disclosure and appreciated by those of ordinary skill in the art from review of the entirety disclosed herein. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 3:
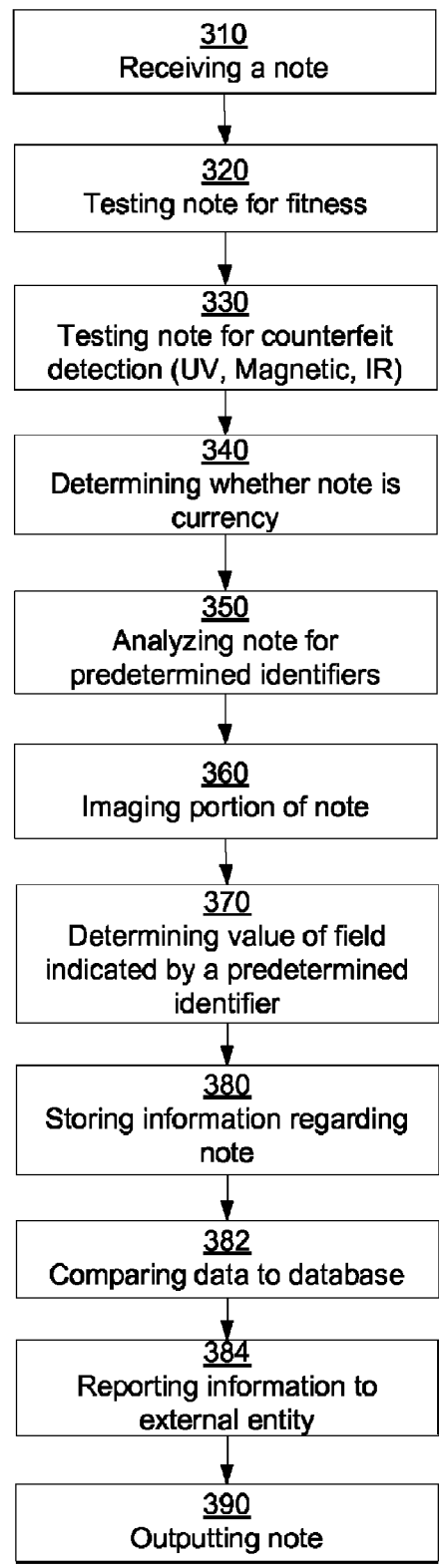
FIG. 3 shows a flowchart illustrating a method for enhanced currency or note processing in accordance with various aspects of the invention.
Figure 4:
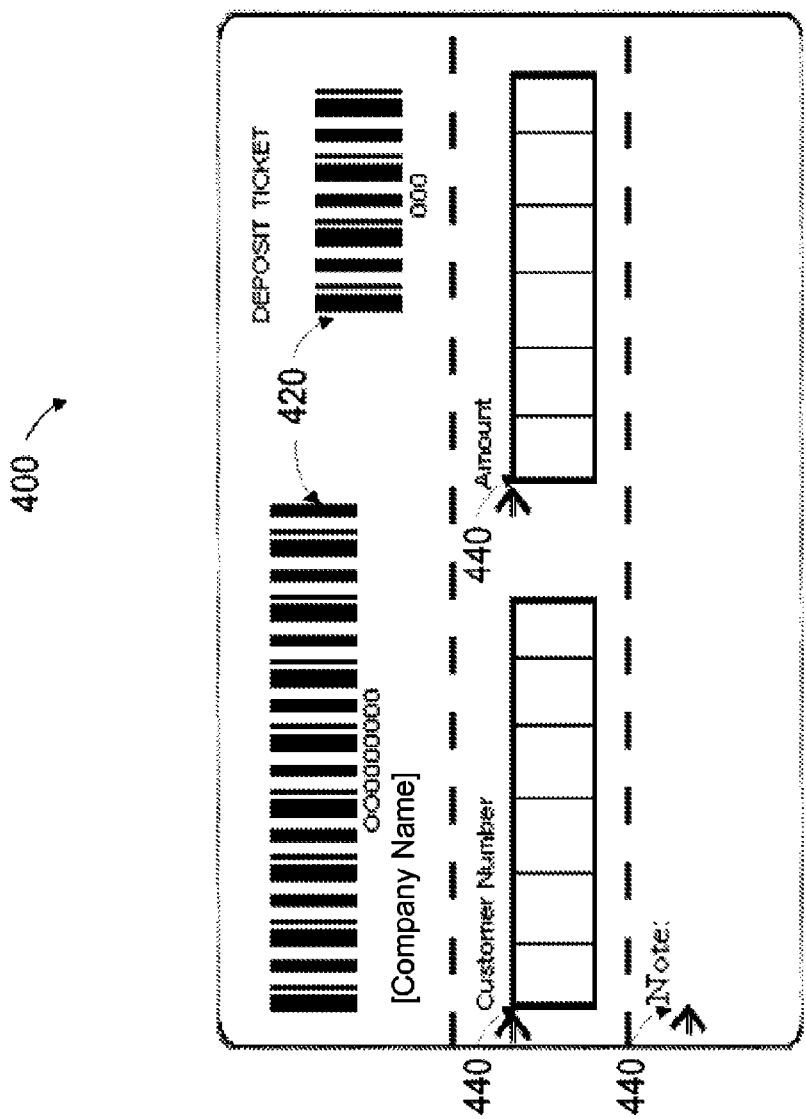
FIG. 4 depicts an illustrative non-currency note that can be processed in accordance with various aspects of the invention.

FIG. 3 shows a flowchart illustrating a method for enhanced currency or note processing in accordance with various aspects of the invention and will be explained with reference to portions of the previously described illustrative environment depicted by FIG. 2. While describing the illustrative method below, examples may be provided relating to an embodiment that may involve the receipt of money at a bank by a teller receiving cash for deposit, possibly accompanied by a deposit ticket, as depicted in FIG. 4. In step 310, note 230 may be received by the teller. After note 230 is received in step 310, the teller may pass note 230 to note processing device 250. Optionally, note processing device 250 may test note 230 for fitness in step 320. Testing note 230 for fitness may involve determining the condition of note 230, such that a note unfit for circulation may be passed to a reject bin to be taken out of circulation. Notes that pass the fitness test may be further processed, including testing for counterfeit detection in step 330. Examples of tests for counterfeit detection include using Ultraviolet, magnetic and infra-red detection to find suspicious/fake bills.

In step 340, note processing device 250 may determine whether note 230 is currency. In step 350, note 230 may be analyzed for certain predetermined identifiers (e.g., mark recognition). The predetermined identifiers may vary depending on the type of note 230 being processed. If no predetermined identifiers are located, the note 230 may be sent to a reject bin to be manually inspected. One example of a predetermined identifier is the serial number fields on currency. Other examples of predetermined identifiers are depicted in FIG. 4.

FIG. 4 depicts deposit ticket 400 with various predetermined identifiers, including barcodes 420 and field anchors 440. In step 360, a portion of note 230 may be imaged. In some embodiments, the portion of note 230 that is imaged may be the entire note. In certain embodiments, if note 230 was determined to be currency, only the serial number portions of note 230 may be imaged.

After note 230 is imaged, the image may be analyzed to determine values of the fields indicated by the predetermined identifiers in step 370. For example, determining the value of the field indicated by the predetermined identifier on currency may involve determining the serial number of the note. Determining values of fields indicated by a predetermined identifier on another type of note may include determining a customer number or the amount of a deposit as indicated by field anchors 440 or a unique identifier number or company name as indicated by barcodes 420 in FIG. 4. One method of determining the value is to use OCR or OMR software, which may determine the value of fields indicated by the predetermined identifiers and provide a score rating the confidence level of the resultant value determination. In step 380, the information regarding the note may be stored in a memory. Optionally, the value of the fields of note 230 may be compared to values of corresponding fields of other notes in step 382. This comparison may be with other notes being processed or with information from a database 240 or some other source of information. Yet another optional aspect of the invention may include reporting the information regarding note 230 to an external entity 220 in step 384.

After processing note 230, the system may output note 230 to various places in step 390. As evident to one skilled in the art, the nature of steps 382, 384 and 390 is such that the steps may occur in any order and in any combination. For example, in one alternative embodiment, the system may output note 230 in step 390 then, at a later time, report information regarding note 230 to an external entity 220 in step 384. As discussed above, one potential disposition of note 230 is to output the note to a reject bin if the note is unfit for circulation or does not contain recognizable predetermined identifiers. Additionally, in some embodiments, note 230 may be output to a reject bin if the note is determined to be counterfeit. If a note passes the fitness test and the conventional counterfeit tests and is not determined to be a counterfeit note based on comparison to a database of known counterfeits, the note may be passed to an output bin or directly to a vault. In instances where the system receives currency and non-currency notes, such as cash along with a deposit ticket, the system may send the currency to one output bin and the non-currency to another or send both to the same output. Additionally, in some embodiments, there may be a separate bin for notes that are determined to be unfit for circulation, a bin for notes that have no recognized predetermined identifiers, a bin for notes that are determined to be counterfeit through conventional testing, a bin for notes that are determined to be counterfeit through comparison with other notes or information in a database and notes that are determined to pass all tests. Any combination of bins would be understood to be useful depending on the purpose of counting and sorting the notes that are being input into the system.

As one skilled in the art would understand based on this disclosure, the same method or process could be used in various other environments. Another example is the deposit of cash at a machine, such as an automated teller machine ("ATM"). Such a process involves the ATM receiving the cash (note 230) in step 310, testing the cash for fitness 320 and for counterfeit detection using conventional methods 330, determining whether the cash is currency 340, analyzing the cash for the serial numbers (predetermined identifiers) 350, imaging the serial numbers 360, determining the value of the serial number fields through OCR and evaluating the confidence level of the recognition of such value 370, storing the denomination, serial number, confidence score and other information in a memory 380, comparing the serial numbers to a database of known counterfeit serial numbers 382 and forwarding the information regarding the currency deposited to a federal regulatory agency 384.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Another embodiment of the disclosure includes forms of computer-readable media. Computer-readable media include any available media that can be accessed by a computing device 102. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the disclosure is contemplated. For example, aspects of the method steps disclosed herein may be executed on a processor on a computing device 102. Such a processor may execute computer-executable instructions stored on a computer-readable medium.

In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

I claim:

1. A computer-assisted method comprising:
    receiving a note;
    imaging at least a portion of the note;
    determining a value of at least one field indicated by a predetermined identifier of the note through character and mark recognition;
    storing information regarding the note in a memory;
    comparing the value of the at least one field to values of corresponding fields of other notes;
    testing the note for counterfeit detection using infra-red detection;
    outputting the note to a bin when the testing indicates that the note is counterfeit; and
    outputting the note to one of an output bin and a vault when the testing indicates that the note is not counterfeit.

2. The method of claim 1, wherein the values of corresponding fields of other notes comprise a range of known values.

3. The method of claim 1, further comprising determining that the note is currency and wherein the at least one field indicated by a predetermined identifier of the note is a serial number.

4. The method of claim 3, wherein imaging at least a portion of the note comprises imaging serial number fields of the note.

5. The method of claim 3, further comprising testing the note for fitness.

6. The method of claim 3, further comprising reporting the information regarding the note to an external entity.

7. The method of claim 1, further comprising determining that the note is not currency, wherein imaging at least a portion of the note comprises imaging the entire note.

8. The method of claim 7, wherein determining a value of at least one field indicated by a predetermined identifier of the note through character and mark recognition comprises analyzing the note image for predetermined identifiers.

9. The method of claim 1, wherein determining a value of at least one field indicated by a predetermined identifier of the note through character and mark recognition comprises:
    determining a customer number and an amount of deposit indicated by field anchors; and
    determining at least one of a unique company number and name identified by a barcode.

10. A tangible computer-readable medium storing computer-executable instructions that, when executed:
    receive image data for at least a portion of a note;
    process the image data;
    determine a value of at least one field indicated by a predetermined identifier of the note through character and mark recognition;
    store information regarding the note in a memory;
    compare the value of the at least one field to values of corresponding fields of other notes;
    determine whether the note is counterfeit using infra-red detection;
    output the note to a bin when the determination indicates that the note is counterfeit; and
    output the note to one of an output bin and a vault when the determination indicates that the note is not counterfeit.

11. The non-transitory computer-readable medium of claim 10, wherein the values of corresponding fields of other notes comprises a range of known values.

12. The non-transitory computer-readable medium of claim 10, wherein the computer-readable instructions, when executed, determine that the note is currency and wherein the at least one field indicated by a predetermined identifier of the note is a serial number and the image data comprises serial number fields of the note.

13. The non-transitory computer-readable medium of claim 12, wherein the computer-readable instructions, when executed, report the information regarding the note to an external entity.

14. The non-transitory computer-readable medium of claim 10, wherein the computer-readable instructions, when executed:
    determine that the note is not currency, and wherein the image data comprises an image of the entire note; and
    analyze the image data of the entire note for predetermined identifiers.

15. A system for processing a note comprising:
    a memory;
    a note processing device, comprising:
        a note processing device memory storing computer-executable instructions; and
        a processor for executing the computer-executable instructions configured to:
            image at least a portion of the note;
            determine a value of at least one field indicated by a predetermined identifier of the note through character and mark recognition;
            store information regarding the note in the system memory; and
            test the note for counterfeit detection using infra-red detection,
    wherein the note is passed to the note processing device, and
    wherein the stored information regarding the note comprises a confidence score regarding the determined value of the at least one field.

16. The system of claim 15, wherein the computer-readable instructions, when executed, determine that the note is currency and wherein the at least one field indicated by a predetermined identifier of the note is a serial number and the image data comprises serial number fields of the note.

17. The system of claim 15, wherein the computer-readable instructions, when executed, report the information regarding the note to an external entity.

18. The system of claim 15, further comprising:
    a bin configured to receive the note when the testing indicates that the note is counterfeit; and
    at least one of an output bin and a vault configured to receive the note when the testing indicates that the note is not counterfeit.

* * * * *